United States Patent Office 2,781,331
Patented Feb. 12, 1957

2,781,331

THIOCYANATED HYDROGENATED DIENE POLYMERS AND PROCESS OF PRODUCING THE SAME

Rufus V. Jones and Peter J. Canterino, Bartlesville, Okla., assignors to Phillips Petroleum Company, a corporation of Delaware No Drawing. Application January 19, 1953,
Serial No. 332,096

7 Claims. (Cl. 260—63)

This invention relates to thermoplastic products prepared by the thiocyanation of hydrogenated polymers. In a further aspect this invention relates to thermoplastic products prepared by thiocyanation of hydrogenated rubbery polymers and copolymers. In a further aspect this invention relates to a method of producing thiocyanated hydrogenated polymers. In a further aspect this invention relates to a method for controlling the amount of thiocyanogen reacted with these rubbery polymers.

Natural rubber has long been used for applications wherein its flexibility is of considerable value. However, when it is used for gaskets, hose, and the like which come in frequent contact with hydrocarbons, it has a tendency to swell and deteriorate. Certain synthetic rubbers have been developed which are superior to natural rubber in this respect but there is still a problem of swelling and deterioration. We have discovered a process for the production of thermoplastic rubbery materials which are superior to those heretofore known when used in applications where the rubber material comes in contact with the solvents which cause deterioration and swelling.

Each of the following objects is attained by at least one of the aspects of this invention.

An object of this invention is to provide thermoplastic thiocyanated hydrogenated polydiene polymers and copolymers. A further object of this invention is to provide a method for preparing these thermoplastic materials, said materials being resistant to deterioration and swelling when in contact with hydrocarbon solvents. A further object of this invention relates to a method for controlling the amount of thiocyanogen which reacts with the diene polymer.

Other objects and advantages of this invention will be apparent to one skilled in the art upon reading this disclosure.

We have discovered that novel thermoplastic products can be prepared by the interaction of hydrogenated rubbery polymers of conjugated dienes with thiocyanogen. These hydrogenated polymers have superior resistance to hydrocarbon solvents over the unhydrogenated polymers and are vastly superior to natural rubber in this regard. The novel products of the present invention, as stated, have improved resistance over those of the parent materials.

The word "polymer" when used in this disclosure is intended to include both homopolymers and copolymers of the conjugated dienes. The materials of the present invention are suitable for use in applications where hydrocarbon solvents are encountered. Specifically may be mentioned, uses such as gasket materials, hose, shoe soles, gloves, boots, protective coverings and the like. They are also useful as adhesive compositions, coating compositions and resins.

According to the present invention, hydrogenated rubbery polymers, in solution, are reacted with thiocyanogen at temperatures in the range from 0 to 60° C., preferably 20 to 30° C. for a period of time sufficient to bring about the desired reaction between the thiocyanogen and the unsaturation in the polymeric material. This time is generally in the range of from 0.25 to 50 hours. We have found that it is desirable to agitate the reaction mixture to provide complete contacting of the reactant materials.

The amount of thiocyanogen employed depends upon several factors. Among these are the particular materials which are used in forming the polymer. As it is a necessary requirement of our invention that the polymer be hydrogenated, the amount of thiocyanogen is, therefore, a function of the residual unsaturation in the polymer following hydrogenation. Another factor which determines the amount tof thiocyanogen used is the desired characteristics of the resultant material. As greater amounts of thiocyanogen are added the product tends to become harder.

As a result of the different situations where homopolymers and copolymers are used, it is more convenient to describe the amount of thiocyanogen in terms of the number of diene units in the polymer. As a result of hydrogenation, it is obvious that there will be less than one double bond per diene unit, on the average.

In the practice of our invention the amount of thiocyanogen employed is in the range of 0.05 to 1 equivalent of said thiocyanogen per ethylenic linkage in the material. Furthermore, it is not necessary that an excess over that required for complete reaction be used. The products of the present invention range from rubbery materials to hard resins, with the increase in hardness being proportional to the increased degree of thiocyanation.

By means of our invention it is possible to control the amount of thiocyanogen added to the polymeric material by the preliminary hydrogenation. This hydrogenation blocks some of the double bonds in the polymer and excessive thiocyanation may be controlled in this way. The present invention is applicable to the thiocyanation of hydrogenated rubbery polymers of conjugated dienes, said materials having unsaturation values in the range from 2 to 90 percent, preferably under 50 percent. Methods of preparing these starting materials are more fully set forth in a copending application of Jones and Moberly, Serial No. 202,797, filed December 26, 1950, now abandoned. These polymers can be prepared by the polymerization of a polymerizable aliphatic conjugated diene or a mixture comprising a major amount of such a conjugated diene and a minor amount of other compounds containing an active vinylidine group. Furthermore, mixtures of various dienes are also suitable. Preferred dienes are those containing 4 to 6 carbon atoms, but, those containing more than 6, say up to 8 or 9, carbon atoms are also suitable. As representative dienes there may be mentioned butadiene, chloroprene, the methylbutadienes and the methylpentadienes. Examples of monomeric materials containing the vinylidene group include aryl olefins such as styrene, parachloro styrene, para-methoxy styrene, alphamethylstyrene, vinylnaphthalene and the like; acrylic and substituted acrylic acids and their esters, nitriles, and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide, and the like, methyl isopropenyl ketone, methyl vinyl ketone, methyl vinyl ether, vinyl acetate, vinyl chloride, vinylidene chloride, and the like. Examples of copolymers prepared by copolymerization of mixtures of compounds, at least one of which is conjugated diene, include, for example, copolymers of butadiene-styrene, butadiene-isoprene, butadiene-methylacrylate, isoprene-styrene and the like. The starting materials can be prepared by any suitable means, but hydrogenation in the presence of a catalyst such as finely divided nickel on kieselguhr, such as described in the above mentioned Jones and Moberly application, is preferred.

The thiocyanation reaction is effected with the starting material dissolved in a suitable solvent. Under some circumstances a dispersion is formed rather than a true solution, but, the word "solution" will hereafter be used and it will be understood that either solution or dispersion is suitable. Suitable solvents applicable for this reaction includes cycloparaffins such as cyclohexane or methylcyclohexane; aromatics such as benzene, ethylbenzene, toluene, and xylene. The thiocyanogen can be used dissolved in a similar solvent and these two solutions mixed and heated, if necessary, to bring about the reaction. It is preferable that the reaction be carried out in an anhydrous system, but small amounts of water may be present. The presence of water tends to interfere with the desired reaction, and thus the reaction should be substantially anhydrous.

In one embodiment of our invention the polymer solution obtained directly from the hydrogenation step can be used as the solution for the thiocyanation reaction. Prior to the second reaction, however, the hydrogenation catalyst should be removed.

Atmospheric pressures are, in general, satisfactory for conducting the thiocyanation reaction. An exception to this is where low boiling solvents are employed, and in such cases it is necessary to use superatmospheric pressures to prevent loss of said solvents.

The following examples are given to illustrate my invention and the superior results obtained thereby. These examples are given by way of illustration and the specific temperatures, times, and amounts are to be considered in that light and not in a limiting sense.

EXAMPLE I

*Hydrogenation of polybutadiene rubber*

A run was made wherein 250 grams of polybutadiene rubber (47 ML4) prepared in an emulsion polymerization recipe at 41° F. was dissolved in 2.5 liters of methylcyclohexane and charged to a hydrogenator. The rubber solution was washed from its container with two 500 ml. portions of methylcyclohexane. Nickel on kieselguhr catalyst [1] was then added and hydrogenation was effected at 350° F. and 500 p. s. i. g. for 3.75 hours. Unsaturation [2] of the product was 24.3 percent.

*Thiocyanation of hydrogenated polybutadiene rubber*

To prepare a series of polymers having different degrees of thiocyanation, three runs were made using hydrogenated polybutadiene prepared as described in the above procedure.

Thiocyanogen was prepared by dispersing 11.38 grams of lead thiocyanate in 200 cc. (319 grams) of carbon tetrachloride, cooling the solution to between 5 and 10° C., and adding 5.2 grams of bromine dissolved in 52 cc. (82.94 grams) of carbon tetrachloride. This procedure for making thiocyanogen is more fully described in "Organic Reactions," volume 3, by Adams et al., John Wiley and Sons, page 255. The thiocyanogen solution was decanted and diluted up to 273 cc. with carbon tetrachloride.

Three bottles were each charged with 138 grams of a solution prepared by dissolving 10 grams of hydrogenated polymer in 250 cc. (398.75 grams) of carbon tetrachloride. To bottle No. 1 was added 168 cc. of thiocyanogen solution representing one equivalent of thiocyanogen per double bond in the polymer; to bottle No. 2 was added 84 cc. of thiocyanogen solution representing 0.5 equivalent of thiocyanogen per double bond in the polymer; and to bottle No. 3 was added 21 cc. of thiocyanogen representing 0.125 equivalent of thiocyanogen per double bond in the polymer. All additions were made at room temperature.

OBSERVATIONS

No. 1 gelled almost immediately, 5–10 minutes.
No. 2 gelled in about 15 minutes.
No. 3 was a loose gel after 1 hour.

After 24 hours the products were coagulated with isopropanol, employing a Waring Blendor to break the gels. Carbon tetrachloride was washed out of the products with isopropanol. Products were filtered and dried at 50° F. in a vacuum oven for 12 hours. A summary of the reactions and analyses of the products is recorded in the following table.

| | Product No. 1 | Product No. 2 | Product No. 3 | Control [1] |
|---|---|---|---|---|
| Amt. of polymer used, gms | 3.3 | 3.3 | 3.3 | 250. |
| Yield of product, gms | 5.8 | 3.6 | 3.1 | 270. |
| Reaction temp., °F | 77 | 77 | 77 | 77. |
| Reaction time, hrs | 24 | 24 | 24 | 24. |
| Percent SCN, by analysis | 29 | 18.6 | 5.4 | 11.6. |
| Swell of starting material, percent [2] | 110 | 110 | 110 | Dissolves. |
| Swell of product, percent | 37 | 64 | 92 | 700. |
| Physical appearance of products molded at 2500 p. s. i. and 250° F. for 5 minutes. | Tough, orange-colored resin, approximately as flexible as shoe sole leather. Molded satisfactorily. | Tough resin. Mottled orange-brown color. Slightly more flexible than Product #1. Molded satisfactorily. | Rubber-like, brown material. Molded satisfactorily. | Rubber-like red material. Would not mold. |

[1] Polybutadiene rubber (30 ML4) prepared in an emulsion polymerization recipe at 41° F. This material was thiocyanated according to the procedure employed for the runs described above employing approximately 1/20 mol of thiocyanogen per diene unit.
[2] Swell was measured in a 70/30 isooctane-toluene mixture at room temperature on a sample 2″ x 1″ x .060″. The sample was immersed for 3 days and swell then determined.

$$\frac{V_2 - V_1}{V_1} \times 100 = \text{percent swell.} \quad (V_1 = \text{initial volume}, V_2 = \text{swelled volume}).$$

[1] Total catalyst for the run was prepared by reducing 180 grams of commercial nickel hydroxide on kieselguhr catalyst in a hydrogen atmosphere and subsequently quenching with 1.5 liters of methylcyclohexane. The catalyst composition (i. e., exclusive of solvent) contained approximately 75 weight percent of nickel on a completely reduced basis.
[2] Unsaturation was determined by the method of Lee, T. S., Kolthoff, I. M., Mairs, M. A., "Determination of Unsaturation of Synthetic and Natural Rubber," Journal of Polymer Science, 3, 6684, (1948).

EXAMPLE II

Two hundred grams of hydrogenated polybutadiene (40 ML4) having 13 percent unsaturation was dissolved in 2 liters of carbon tetrachloride. A solution of thiocyanogen was prepared by dissolving 171 grams of lead thiocyanate in 780 ml. of carbon tetrachloride, cooling the solution to a temperature between 5 and 10° C. and adding 77 grams of bromine dissolved in 770 ml. of carbon tetrachloride. The solution so prepared was decanted and poured into the hydrogenated polybutadiene solution and the mixture allowed to stand at room temperature for 72 hours. Coagulation was effected by pouring into isopropyl alcohol. The thiocyanated polymer was then removed, washed and dried to provide a yield of 239 grams. Analysis showed 8 percent sulfur corresponding to 14.5 percent thiocyanogen. Sixty-three percent of the original 13 percent unsaturation was removed by the thiocyanation. Data showing a comparison of the properties of this product with those of the hydrogenated polybutadiene starting material are tabulated below:

|  | 300+ modulus | 80° F. tensile | Elong. | 200° F. tensile | Shore hardness | Swell (percent) | Extraction (percent) | Comp. set relaxed | | Gehman freeze pt. (C.) | Ozone rating[1] |
|---|---|---|---|---|---|---|---|---|---|---|---|
|  |  |  |  |  |  |  |  | 10 sec. | 30 min. |  |  |
| Thiocyanated product | 1,070 | 1,500 | 465 | 25 | 84 | 140.0 | 2.4 | 93.0 | 87.9 | −48 | 0 |
| Hydrogenated polybutadiene | 550 | 970 | 810 | 0 | 80 | 185.3 | 5.5 | 93.4 | 88.4 | −56 | 0 |

[1] Best rating 0, poorest 10.

As will be noted, the tensile strength and percent swell were improved by thiocyanation without loss of original properties in other respects. The thiocyanated product can be cooled in a Dry-Ice acetone bath and struck with a hammer without breaking.

The effect of thiocyanation of a non-hydrogenated material is shown in the following examples.

EXAMPLE III

Fifty grams of polybutadiene (20 ML4) was dissolved in 1 liter of carbon tetrachloride. A solution of thiocyanogen was prepared in the manner described above using 33 grams of bromine in 330 grams of carbon tetrachloride and 101 grams lead thiocyanate in 798 grams carbon tetrachloride. The solution so prepared was decanted and added to the polymer solution and the mixture allowed to stand overnight at room temperature. Coagulation was effected by pouring into isopropyl alcohol. The thiocyanated product was recovered, washed and dried to provide a yield of 65 grams. Analysis showed a sulfur content of 18.4 percent corresponding to 33.4 percent thiocyanogen. This product was a red, heavy, rubbery material which could not be molded, the samples fusing poorly and returning to their original shape when pressure was removed.

EXAMPLE IV

In another run, 25 grams of polybutadiene (20 ML4) was dissolved in 1 liter of carbon tetrachloride. A solution of thiocyanogen was prepared as described above, using 150 grams of lead thiocyanate in 750 ml. of carbon tetrachloride and 83 grams of bromine in 830 ml. of carbon tetrachloride. The solution was decanted, added to the polymer solution and allowed to stand overnight. Coagulation was effected by pouring into isopropanol after which the product was recovered, washed and dried. Sulfur by analysis was 32.3 percent corresponding to 58.5 percent thiocyanogen. Of the original unsaturation 73 percent was removed by thiocyanation. The product was a dry crumbly material which could not be molded.

As many possible embodiments may be made of this invention without departing from the scope thereof, it is to be understood that all matter herein set forth is to be interpreted as illustrative and not in a limiting sense.

We claim:

1. A thermoplastic material comprising a polymer of a conjugated diene having 4 to 6 carbon atoms and up to a minor amount of a copolymerizable monomer containing an active vinylidene group, said polymer having been hydrogenated to produce a material having an unsaturation in the range from 2 to 50 percent and thereafter thiocyanated, the resulting material containing 5 to 30 percent by weight thiocyanogen.

2. The material of claim 1 in which said polymer is a copolymer comprising a major portion of a conjugated diene containing 4 to 6 carbon atoms and a minor portion of a copolymerizable monomer containing an active vinylidene group.

3. A thermoplastic material comprising thiocyanated polybutadiene, said polybutadiene having been hydrogenated to produce a material having an unsaturation in the range of 2 to 50 percent and thereafter thiocyanated, the resulting material containing 5 to 30 percent by weight thiocyanogen.

4. The process of preparing a thermoplastic thiocyanated hydrogenated polymeric material which comprises reacting a solution of a hydrogenated polymer of a conjugated diene containing 4 to 6 carbon atoms and up to a minor amount of a copolymerizable monomer containing an active vinylidene group, the residual unsaturation of said polymer having been reduced to a value of 2 to 50 percent by hydrogenation, with a thiocyanogen solution to produce a thermoplastic thiocyanated hydrogenated polymeric product containing 5 to 30 percent thiocyanogen.

5. A process of claim 4 in which said polymer is a copolymer prepared by polymerizing a major portion of a conjugated diene containing 4 to 6 carbon atoms and a minor portion of a copolymerizable monomer containing an active vinylidene group.

6. A process for preparing thermoplastic thiocyanated hydrogenated conjugated diene polymers, the unsaturation of said conjugated diene polymer having been reduced to a value of 2 to 50 percent by hydrogenation, comprising, dispersing said hydrogenated polymer in a solvent, dissolving thiocyanogen in a solvent, maintaining said solutions substantially anhydrous, and adding said thiocyanogen solution to said hydrogenated conjugated diene polymer solution, the amount of said thiocyanogen being in the range of 0.05 to 1 equivalent per ethylenic linkage in said polymer, at a temperature of 0° to 60° C. for a time of 0.25 to 50 hours, and recovering resulting thiocyanated hydrogenated diene polymer, said resulting product containing 5 to 30 percent thiocyanogen.

7. A process for preparing thermoplastic thiocyanated hydrogenated polybutadiene polymers, the unsaturation of said polybutadiene polymer having been reduced to a value of 2 to 50 percent by hydrogenation, comprising, dispersing said hydrogenated polymer in a solvent, dissolving thiocyanogen in a solvent, maintaining said solution substantially anhydrous, and adding said thiocyanogen solution to said hydrogenated conjugated diene polymer solution, the amount of said thiocyanogen being in the range of 0.05 to 1 equivalent per ethylenic linkage in said polymer, at a temperature of 0 to 60° C. for a time of 0.25 to 50 hours, and recovering resulting thiocyanated hydrogenated polybutadiene polymer, said resulting product containing 5 to 30 percent thiocyanogen.

References Cited in the file of this patent

UNITED STATES PATENTS

| 2,046,160 | Graves | June 30, 1936 |
| 2,287,774 | Bacon et al. | June 30, 1942 |